United States Patent
Drescher et al.

(10) Patent No.: US 9,963,096 B2
(45) Date of Patent: May 8, 2018

(54) VEHICLE INFOTAINMENT AND CONNECTIVITY SYSTEM

(71) Applicant: CONTINENTAL AUTOMOTIVE SYSTEMS, INC., Auburn Hills, MI (US)

(72) Inventors: Susan Adelle Drescher, Bloomfield Hills, MI (US); Tejas Bhupendra Desai, Troy, MI (US)

(73) Assignee: Continental Automotive Systems, Inc., Auburn, MI (US)

( * ) Notice: Subject to any disclaimer, the term of this patent is extended or adjusted under 35 U.S.C. 154(b) by 185 days.

(21) Appl. No.: 14/942,401

(22) Filed: Nov. 16, 2015

(65) Prior Publication Data

US 2017/0136969 A1    May 18, 2017

(51) Int. Cl.

| | |
|---|---|
| *G10L 15/25* | (2013.01) |
| *B60R 16/037* | (2006.01) |
| *H04N 5/77* | (2006.01) |
| *H04N 5/33* | (2006.01) |
| *G06F 3/16* | (2006.01) |
| *G06F 3/00* | (2006.01) |
| *G10L 15/20* | (2006.01) |
| *G10L 25/78* | (2013.01) |

(52) U.S. Cl.
CPC .......... *B60R 16/0373* (2013.01); *G06F 3/005* (2013.01); *G06F 3/167* (2013.01); *G10L 15/25* (2013.01); *H04N 5/33* (2013.01); *H04N 5/77* (2013.01); *G10L 15/20* (2013.01); *G10L 25/78* (2013.01)

(58) Field of Classification Search
CPC ..... G10L 15/25; G10L 99/00; B60R 16/0373; H04N 5/77; H04N 5/33; G06F 3/005; G06F 3/167

USPC ................. 704/231, 236, 243, 251–257, 275
See application file for complete search history.

(56) References Cited

U.S. PATENT DOCUMENTS

| | | | |
|---|---|---|---|
| 8,700,392 B1* | 4/2014 | Hart ......................... | G10L 15/25 704/231 |
| 2003/0171932 A1* | 9/2003 | Juang ...................... | G10L 15/24 704/276 |
| 2010/0037072 A1 | 2/2010 | Nejah | |
| 2010/0161339 A1* | 6/2010 | De Mers ................. | G10L 15/01 704/275 |

(Continued)

FOREIGN PATENT DOCUMENTS

WO    2015/094891 A1    6/2015

OTHER PUBLICATIONS

International Search Report and Written Opinion dated Mar. 16, 2017 from corresponding International Patent Application No. PCT/US2016/062306.

*Primary Examiner* — Genna M Mott

(57) ABSTRACT

An infotainment and connectivity system for a vehicle includes a control module, a first plurality of input devices, and a plurality of output devices. The control module includes a first control logic sequence, a plurality of software based programs, and a memory module. The control logic operates to control operation of the infotainment and connectivity system. The first plurality of input devices is disposed on an interior of the vehicle and includes a camera, a microphone, and an image sensor. The plurality of output devices includes at least a communication synchronization system.

18 Claims, 2 Drawing Sheets

(56) References Cited

U.S. PATENT DOCUMENTS

| | | | |
|---|---|---|---|
| 2014/0207471 A1* | 7/2014 | Aberg | G10L 15/28 |
| | | | 704/275 |
| 2014/0214424 A1* | 7/2014 | Wang | G06K 9/00288 |
| | | | 704/246 |
| 2014/0227980 A1 | 8/2014 | Esselink et al. | |
| 2016/0150195 A1* | 5/2016 | Good | H04N 7/188 |
| | | | 348/143 |

* cited by examiner

VEHICLE INFOTAINMENT AND CONNECTIVITY SYSTEM

FIELD

The present disclosure relates to an electronic device, and more particularly to an electronic device for a vehicle that requires communications functions between a vehicle operator and the electronic device.

BACKGROUND

The statements in this section merely provide background information related to the present disclosure and may or may not constitute prior art.

Electronic devices such as navigation systems and entertainment systems are becoming more common in modern vehicles. These electronic devices typically include an area for user interaction with the device and an area for displaying information for the user. Some of these electronic devices provide such functionality of audible voice inputs for commanding certain features of the electronic device. However, in some applications, the capability of the electronic device to receive audible voice inputs is compromised by ambient noise, sudden noises, and the location of the input source relative to the input receiver.

Current market products attempt to improve functionality of voice command or other methods of remote commanding a vehicle functions, however, the marketed solutions either only address background noise on the interior of the vehicle, fail to perform as expected, or fail to perform in all use cases. Therefore, while current products achieve some success, there remains a need for improved accuracy and efficiency in communications between vehicle operators and the vehicle electronic and connectivity systems.

SUMMARY

An infotainment and connectivity system for a vehicle is provided, the infotainment and connectivity system includes a control module, a first plurality of input devices, and a plurality of output devices. The control module has a first control logic sequence, a plurality of software based programs, and a memory module. The control logic operates to control operation of the infotainment and connectivity system. The first plurality of input devices is disposed on an interior of the vehicle. The first plurality of input devices is operably coupled to the control module, includes at least one of a camera, a microphone, and an image sensor, and wherein the image sensor has an infrared sensor for low light video recording. The plurality of output devices is disposed on the interior of the vehicle. The plurality of output devices is operable coupled to the control module and includes at least a communication synchronization system.

In another example of the present invention, the first plurality of input devices includes each of a camera, a microphone, and an image sensor.

In yet another example of the present invention, the infotainment and connectivity system further includes a second plurality of input devices disposed on the exterior of the vehicle.

In yet another example of the present invention, the second plurality of input devices includes at least one of a camera, a microphone, and an image sensor.

In yet another example of the present invention, the communication synchronization system synchronizes the control module of the infotainment and connectivity system with a personal communication device.

In yet another example of the present invention, the control module communicates with cloud based servers including accessing cloud based software programs and cloud based memory storage.

In yet another example of the present invention, one of the plurality of software based programs of the control module or the cloud based servers is configured to translate video data to spoken language.

In yet another example of the present invention, the first control logic sequence includes a first through ninth control logic steps. The first control logic receives and converts a verbal command from a person inside the vehicle. The second control logic records a visual data file of the person speaking the verbal command. The third control logic simultaneously records an audio data file of the person speaking the command. The fourth control logic employs the lip reading software to compare the visual data file recorded by the camera to a known data file set to get the best match of the visual data file to a known command. The fifth control logic synchronizes the known command with the audio data file. The sixth control logic compares the known command derived from the visual data file with the audio data file. The seventh control logic issues the known command to one of the plurality of output devices if the known command matches the audio data file. The eighth control logic issues an audible request to the person to reissue the audio command if the known command does not match the audio data file.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
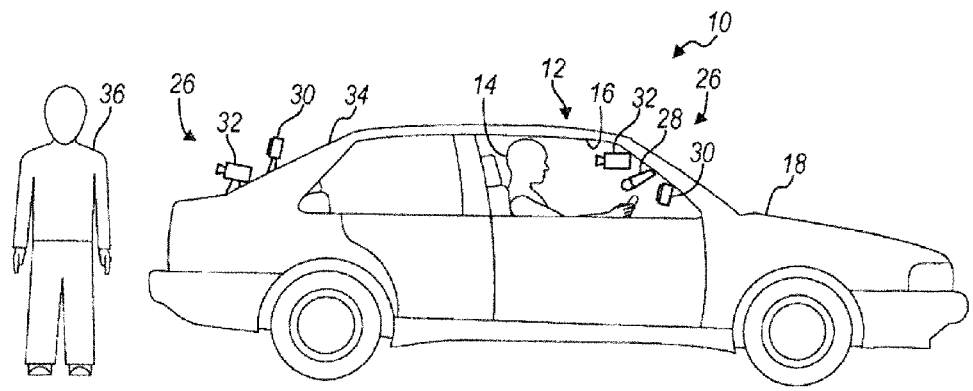
FIG. 1 is a diagram of a vehicle having a vehicle infotainment and connectivity system in accordance with an embodiment of the present invention.
Figure 2:
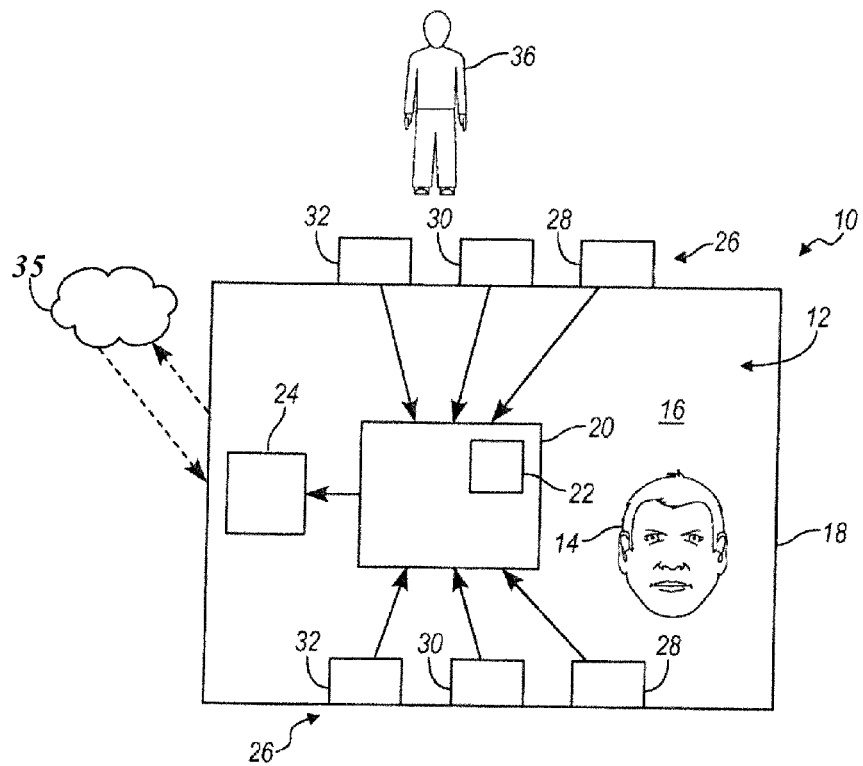
FIG. 2 is an schematic diagram of a vehicle having a vehicle infotainment and connectivity system in accordance with an embodiment of the present invention.

Referring to the drawings, wherein like reference numbers refer to like components, in FIGS. 1 and 2 an operating environment 10 for an electronic device 12 is shown in accordance with an example of the present invention. An object 14 is disposed in the operating environment 10 and may interact with the electronic device 12, as will be described below. In the example provided, the operating environment 10 is an interior cabin 16 of a vehicle 18, the electronic device 12 is an infotainment and connectivity system 12 disposed in the vehicle 18, and the object 14 is a driver 14 of the vehicle 18. The infotainment and connectivity system includes radio controls, a DVD player, a navigation system, and vehicle controls such as climate controls, cell phone connectivity, vehicle security, driver assist settings, etc. For example, the radio controls provide access to AM, FM, satellite radio frequencies, and Bluetooth connectivity controls. However, other examples of functions of the infotainment and connectivity system 12 may be included without departing from the scope of the invention. The control module 20 may be further connected to any and all systems of the vehicle 18 for facilitating operational functions of those particular systems.

The infotainment and connectivity system 12 includes a control module 20, a memory module 22, a plurality of output devices 24, and a plurality of input devices 26. The control module 20 includes microprocessors, algorithms, data processors, electronic devices, and a variety of software programs having control logic for performing functions of the infotainment and connectivity system 12 which includes in general receiving input data from the plurality of input devices 26, performing algorithms for processing data, and outputting signals to provide or perform various information, functions, and operations. In the example provided, the control module 20 and memory module 22 may include hardware or software contained by the infotainment and connectivity system 12, however, the infotainment and connectivity system 12 may communicate with a cloud server 35 or other server based software and memory without departing from the scope of the invention.

The plurality of input devices 26 includes, but is not limited to, a voice input or microphone 28, an image sensor 30, and a video camera 32 disposed in the interior cabin 16 of a vehicle 18. The input devices 26 are configured to receive audio and visual data provided by the driver 14 of the vehicle 18, or in some cases, a passenger of the vehicle 18. For example, in an autonomous vehicle, all people in the vehicle are passengers and therefore may provide commands to the infotainment and connectivity system 12. In another example, the plurality of input devices 26 is disposed on an exterior surface 34 of the vehicle 18. In this configuration, the input devices 26 receive audio and visual data provided by a person 36 outside the vehicle 18.

The voice input or microphone 28 of the plurality of input devices 26 is capable of receiving audio data and providing it to the control module 20. Among the software included in the control module 20 or cloud server 35 is a voice recognition software capable of converting audio data to commands that are comprehensible by the control module 20 and manipulated into various commands directed to the various output devices 24. One such example of a command input includes the driver reciting "Call home." The voice recognition software will identify the input command, convert the input command to an output instruction, and send the instruction to the proper output device. In this instance, the driver's cell phone, which is connected to the infotainment and connectivity system 12 via Bluetooth or other wireless or wired connection, will be instructed to place a call to the phone number listed under the contact "Home." Another example of a command input includes the person outside the vehicle reciting "Open the trunk." Again, the voice recognition software will identify the input command, convert the input command to an output instruction, and send the instruction to the proper output device. In this instance, the output command is sent to a trunk latching device to unlatch the trunk and allow the trunk lid to open.

Other functions included to operate in concert with the voice recognition software include the capability to decipher voice audio commands from ambient noise and the capability to decipher a voice audio command of one person or driver from that of another person. For example, if a child learns to initiate a cell phone call by watching his or her parent, the voice recognition software will recognize that the command to "Call home" was issued by the child and not the driver.

The image sensor 30 of the plurality of input devices 26 is capable of receiving visual data and providing it to the control module 20. Additional software imbedded in the control module 20 or cloud server 35 includes a software program including lip reading technology that is configured to translate video data of a person speaking into verbal language or commands. The lip reading technology pairs or synchronizes the audio data with the visual data to provide a more accurate recognition of the audio command. For example, the lip reading technology functions to detect when the person giving the command is speaking by detecting lip or mouth movement and synchronize the audio data to the visual data to improve the ability to filter the unwanted audio data. The software will recognize the noise that was present prior to the facial movement, identify the prior ambient audio data while the person is speaking, and remove the unwanted audio data from the target audio data produced by the speaker 14, 36. Further technology that may be imbedded in a software program includes skin vibration detection technology. The skin vibration technology may also be paired with audio and visual data to improve the accuracy and efficiency of the control module 20. The image sensor 30 also includes an infrared sensor to record visual data in low light conditions.

The camera 32 of the plurality of input devices 26 is also capable of receiving visual data and providing it to the control module 20. The camera 32 may be used in tandem with an infrared sensor to provide visual data to the control module 20 during low or no light conditions, such as at night or in a dark parking structure or garage. The camera 32 may also provide visual data of skin vibration of the speaker 14, 36 that may also be used in conjunction with audio data to improve recognition accuracy of audio commands.

Figure 3:
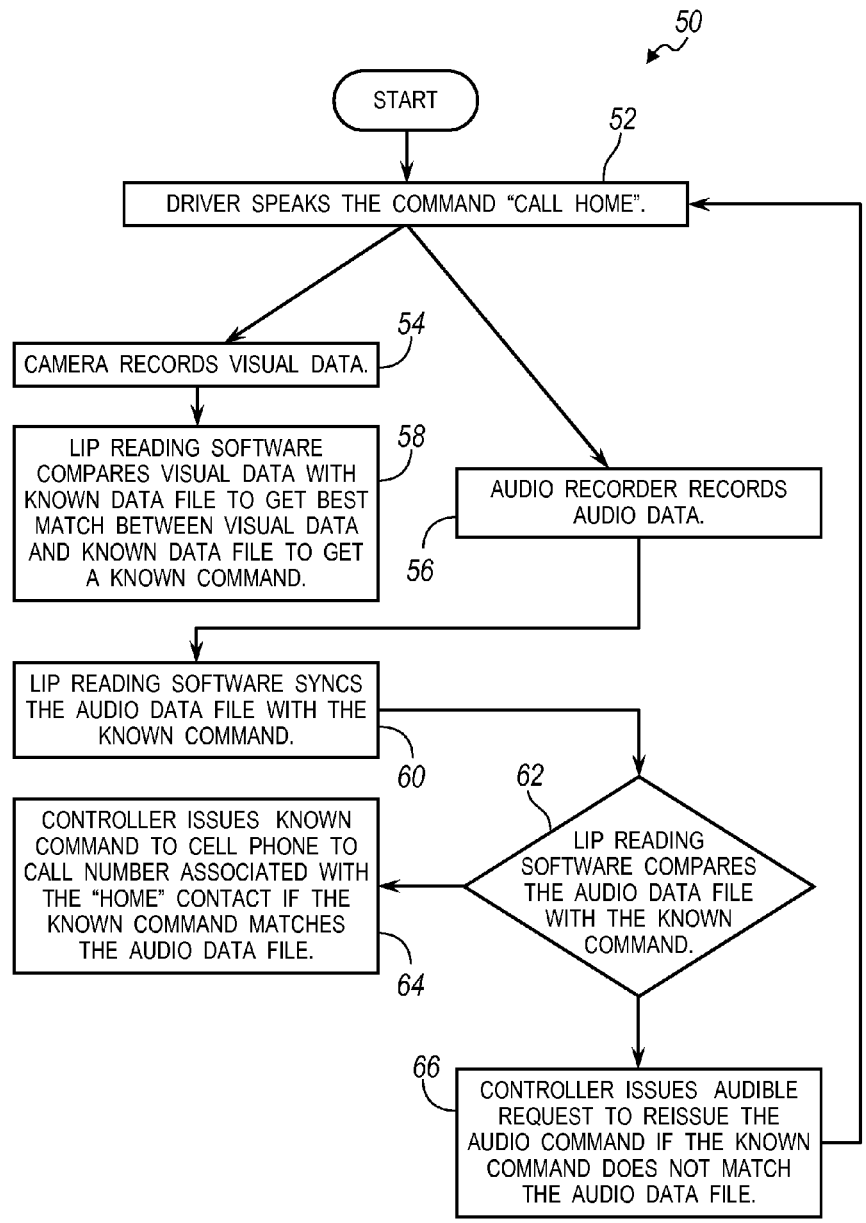
FIG. 3 is a flowchart illustrating a method of receiving and processing a command to a vehicle infotainment and connectivity system in accordance with an embodiment of the present invention.

Turning attention to FIG. 3, the infotainment and connectivity system 12 provides a method 50 for receiving and converting a verbal command from the driver 14 of the vehicle 18. The method 50 may also take the form of control logic programed into the control module 20 of the infotainment and connectivity system 12. The method 50 begins with a first step 52 as the driver 14 speaks a command, for example, the driver says, "call home." In a second step 54, the camera 32 records a visual data file of the driver 14 speaking the command. Simultaneously, a third step 56 records an audio data file of the driver speaking the command. In a fourth step 58, the control module 20 uses lip reading software to compare the visual data file recorded by the camera 32 in the second step 54 to a known data file set to get the best match of the visual data file to a known command. A fifth step 60 synchronizes the known command with the audio data. A sixth step 62 compares the known command derived from the visual data file with the audio data file. A seventh step 64 issues the known command to the proper device, in this instance, a cellular phone, if the know command matches the audio data file. An eighth step 66 provides an audible request to the person to reissue the audio command if the know command does not match the audio data file.

The description of the invention is merely exemplary in nature and variations that do not depart from the gist of the invention are intended to be within the scope of the inven-

What is claimed is:

1. An infotainment and connectivity system for a vehicle, the infotainment and connectivity system including:
   a control module having a first control logic sequence and a memory module, wherein the control logic operates to control operation of the infotainment and connectivity system;
   a first plurality of input devices disposed on an interior of the vehicle, and wherein the first plurality of input devices is configured to receive data, including audio data and video data, from the interior of the vehicle and operably coupled to the control module; and
   a plurality of output devices disposed on the interior of the vehicle, and wherein the plurality of output devices includes at least a communication synchronization system and is operably coupled to the control module;
   wherein the control module is configured to record the audio into an audio file, record the video data into a video file, subsequently compare the video data to a known voice command set to responsively derive a known voice command from the video file, and subsequently synchronize the known voice command with the audio file.

2. The infotainment and connectivity system of claim 1 wherein the first plurality of input devices includes at least one of a video camera, a microphone, and an image sensor.

3. The infotainment and connectivity system of claim 2 wherein the first plurality of input devices includes each of a video camera, a microphone, and an image sensor.

4. The infotainment and connectivity system of claim 1 further including a second plurality of input devices disposed on the exterior of the vehicle.

5. The infotainment and connectivity system of claim 4 wherein the second plurality of input devices includes at least one of a video camera, a microphone, and an image sensor.

6. The infotainment and connectivity system of claim 5 wherein the image sensor of the second plurality of input devices includes an infrared sensor for low light video recording.

7. The infotainment and connectivity system of claim 1 wherein the communication synchronization system synchronizes the control module of the infotainment and connectivity system with a personal communication device.

8. The infotainment and connectivity system of claim 1 wherein the control module communicates with cloud based servers including accessing cloud based software programs and cloud based memory storage.

9. The infotainment and connectivity system of claim 1 wherein the control module further includes a software program configured to translate video data to spoken language.

10. An infotainment and connectivity system for a vehicle, the infotainment and connectivity system including:
    a control module having a first control logic sequence, a plurality of software based programs, and a memory module, wherein the control logic operates to control operation of the infotainment and connectivity system;
    a first plurality of input devices disposed on an interior of the vehicle, and wherein the first plurality of input devices is operably coupled to the control module, including a camera configured to receive video data and a microphone configured to receive audio data; and
    a plurality of output devices disposed on the interior of the vehicle, and wherein the plurality of output devices is operably coupled to the control module and includes at least a communication synchronization system;
    wherein the control module is configured to record the audio data into an audio file, record the video data into a video file, compare the video data to a known voice command set to derive a known voice command, and synchronize the known voice command with the audio file.

11. The infotainment and connectivity system of claim 10 wherein the first plurality of input devices includes each of the camera, the microphone, and an image sensor.

12. The infotainment and connectivity system of claim 10 further including a second plurality of input devices disposed on the exterior of the vehicle.

13. The infotainment and connectivity system of claim 12 wherein the second plurality of input devices includes at least one of a camera, a microphone, and an image sensor.

14. The infotainment and connectivity system of claim 10 wherein the communication synchronization system synchronizes the control module of the infotainment and connectivity system with a personal communication device.

15. The infotainment and connectivity system of claim 10 wherein the control module communicates with cloud based servers including accessing cloud based software programs and cloud based memory storage.

16. The infotainment and connectivity system of claim 15 wherein one of the plurality of software based programs of the control module or the cloud based software programs is configured to translate video data to spoken language.

17. A method of receiving a verbal command from a person inside a vehicle and converting the verbal command to an output command, the method including:
    a first step for providing an infotainment and connectivity system for the vehicle, the infotainment and connectivity system including a plurality of input devices, a control module, and a plurality of output devices;
    a second step for receiving and converting a verbal command from a person inside the vehicle;
    a third step for recording a visual data file of the person speaking the verbal command;
    a fourth step for the control module to simultaneously record an audio data file with the visual data file of the person speaking the command using one device of the plurality of input devices;
    a fifth step for employing lip reading software to compare the visual data file recorded by one of the plurality of input devices to a known data file set to determine a known command;
    a sixth step for subsequently synchronizing the known command with the audio data file;
    a seventh step for subsequently comparing the known command derived from the visual data file with the audio data file;
    an eighth step for issuing the known command to one of the plurality of output devices if the known command matches the audio data file;
    a ninth step for making an audible request to the person to reissue the audio command if the known command does not match the audio data file.

18. The method of claim 17 wherein the plurality of input devices of the infotainment and connectivity system includes each of a camera, a microphone, and an image sensor disposed on an interior of the vehicle.

* * * * *